US012567431B1

(12) United States Patent
Jones

(10) Patent No.: US 12,567,431 B1
(45) Date of Patent: Mar. 3, 2026

(54) BACKGROUND NOISE MUTE NOTIFICATION IN CALLING

(71) Applicant: Meta Platforms, Inc., Menlo Park, CA (US)

(72) Inventor: Ian David Jones, Hermitage (GB)

(73) Assignee: Meta Platforms, Inc., Menlo Park, CA (US)

( * ) Notice: Subject to any disclaimer, the term of this patent is extended or adjusted under 35 U.S.C. 154(b) by 281 days.

(21) Appl. No.: 18/135,516

(22) Filed: Apr. 17, 2023

(51) Int. Cl.

| | |
|---|---|
| ***G10L 21/0364*** | (2013.01) |
| ***G10L 21/034*** | (2013.01) |
| ***G10L 25/78*** | (2013.01) |
| ***G10L 25/84*** | (2013.01) |

(52) U.S. Cl.
CPC ........ *G10L 21/0364* (2013.01); *G10L 21/034* (2013.01); *G10L 25/84* (2013.01); *G10L 2025/783* (2013.01)

(58) Field of Classification Search
CPC .... G10L 21/0364; G10L 21/034; G10L 25/84
See application file for complete search history.

(56) References Cited

U.S. PATENT DOCUMENTS

| | | | | |
|---|---|---|---|---|
| 12,010,459 | B1 * | 6/2024 | Dunne | G06V 40/172 |
| 2010/0080374 | A1 * | 4/2010 | Hepworth | H04M 3/563 379/202.01 |
| 2015/0032451 | A1 * | 1/2015 | Gunn | G10L 15/20 704/244 |
| 2017/0229121 | A1 * | 8/2017 | Taki | G06F 3/167 |
| 2019/0068389 | A1 * | 2/2019 | Chitre | H04L 12/1863 |
| 2020/0110572 | A1 * | 4/2020 | Lenke | G06F 3/167 |
| 2021/0068714 | A1 * | 3/2021 | Crowley | G06F 3/167 |

* cited by examiner

*Primary Examiner* — Daniel C Washburn
*Assistant Examiner* — Paul J. Mueller
(74) *Attorney, Agent, or Firm* — EVERSHEDS SUTHERLAND (US) LLP

(57) ABSTRACT

Systems, methods, and non-transitory computer readable media are configured to perform operations comprising analyzing a signal associated with a user in a call; determining the existence of background noise associated with the user during the call; and performing an action during the call to mitigate the background noise associated with the user.

16 Claims, 9 Drawing Sheets

BACKGROUND NOISE MUTE NOTIFICATION IN CALLING

FIELD OF THE INVENTION

The present technology relates to the field of digital communications. More particularly, the present technology relates to detection and suppression of background noise during a call.

BACKGROUND

People can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run applications to allow calling between or among various users.

SUMMARY

Various embodiments of the present technology can include systems, methods, and non-transitory computer readable media configured to perform operations comprising analyzing a signal associated with a user in a call; determining the existence of background noise associated with the user during the call; and performing an action during the call to mitigate the background noise associated with the user.

In some embodiments, the action is provision of a notification to the user to prompt selection of a mute control.

In some embodiments, the action is provision of a notification to a participant in the call other than the user to prompt selection of a mute control.

In some embodiments, the action is muting of the user without action taken by the user.

In some embodiments, the determining the existence of background noise is based on a determination of the absence of speech in audio data of the signal.

In some embodiments, the determining the existence of background noise is further based on a determination of a volume level of the audio data.

In some embodiments, the determining the existence of background noise is further based on satisfaction of a threshold confidence level by a confidence level associated with the determination of the absence of speech in the audio data and satisfaction of a threshold volume level by the volume level of the audio data.

In some embodiments, the confidence level associated with the determination of the absence of speech in the audio data is based at least in part on a determination that a participant in the call who is talking is not the user.

In some embodiments, the determining the existence of background noise is based at least in part on a determination that video data of the signal does not reflect speaking by the user.

In some embodiments, the action is provision of a notification indicating the existence of background noise that is displayed for as long as the background noise is detected.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
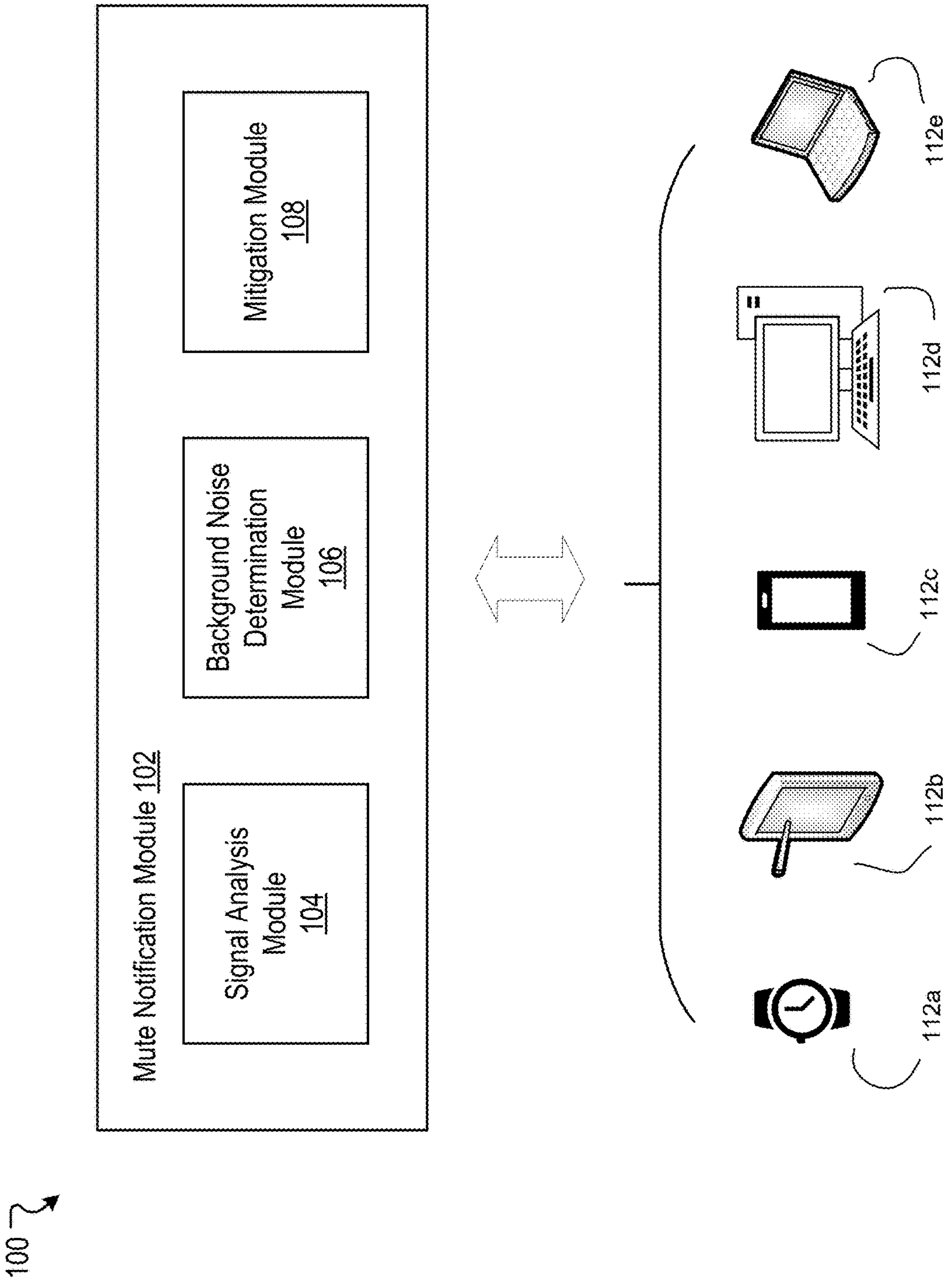
FIG. 1 illustrates an example system including a mute notification module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run applications to allow calling between or among various users.

In conventional techniques, an application associated with a communications platform can support calling between or among many users. By utilizing the application, a user can conduct various types of real time (or near real time) calling with other users. The various types of calling can include audio calls and video calls. For example, a video call can allow different users to connect and communicate with one another in real time. Typically, users can participate in a video call through an application installed on a computing device and associated with a communications platform supporting the video call. Utilizing the application and a camera, each user can be captured in a video stream as the user participates in the video call. The different video streams of users can be processed and combined in some manner by the communications platform and, in turn, each user can be provided through the application a video stream that is representative of the video call. The video stream provided to each user can contain one or more of the individual video streams capturing each user as they participate in the video call. While video calls can be conducted with traditional, unmodified video streams of users, video calls are increasingly being performed in augmented reality (AR), virtual reality (VR), or mixed reality (MR).

The application supporting a call can provide a user with various controls to optimize some aspect of the call. Controls can include options to increase volume, decrease volume, turn on camera, turn off camera, zoom in, zoom out, share screen, unshare screen, raise hand, unraise hand, add participant, remove participant, start recording, stop recording, mute, unmute, and the like. With respect to controls relating mute and unmute in particular, a user can manipulate the controls to selectively permit or preclude the other users in the call to hear sound emanating from the user or the environment of the user. In some instances, when the user believes that certain sounds generated by the user or the surroundings of the user are inappropriate for the other users in the call to hear, the user may affirmatively select (or enable) the mute control. Selection of the mute control can prevent sound associated with the user from being heard by other users in the call. In other instances, when a call is initiated, the application may default to a setting in which the mute option is already enabled.

In some circumstances, the user may speak with the intent to communicate with the other users in the call without realizing that the mute control has been selected. In these circumstances, conventional techniques can determine the existence of speech generated by the user (or surroundings of the user) while the mute option is enabled. In addition, the conventional techniques can provide a notification to the user indicating that the mute option is enabled to inform or remind the user that the speech is not being heard by other users in the call. The notification can prompt the user to disable the mute option so that the user can be heard by the other users in the call.

A problem can arise when sounds generated by a user or emanating from the environment of the user are inappropriate for other users in the call to hear yet are still audible to the other users. Inappropriate sounds can be any types of sounds that detract from the purpose, quality, focus, or audibility of the call. For example, the sounds can include tapping on a keyboard, extended coughing, or a running vacuum cleaner. When left unmitigated, inappropriate sounds can be at least annoyances to users in a call. In some instances, inappropriate sounds can even distract users or render speech communicated during a call entirely inaudible. Often, the user associated with the inappropriate sounds fails to realize their presence and their disruptive impact on the call. As a result, no remedial action is taken to mitigate the effects of the inappropriate sounds and the quality of the call is accordingly compromised.

An improved approach rooted in computer technology overcomes the foregoing and other disadvantages associated with conventional approaches specifically arising in the realm of computer technology. The present technology can obtain a signal associated with capture of a user participating in a call, such as a video call. The signal can be a media stream that includes audio data and video data of the user and an environment of the user captured by a camera and microphone during the video call. The audio data and the video data can be extracted from the signal and separated as an audio signal and a video signal. The audio signal can be analyzed in real time (or near real time). A selected sampling of the audio signal can be analyzed. Based on analysis of the audio signal, it can be determined whether sound represented by the audio signal reflects speaking by the user. In addition, a selected sampling of the audio signal can be analyzed to determine a volume level of the audio signal. If the sound does not reflect speech by the user and if the volume level of the sound satisfies a threshold volume level, it can be determined that the sound is background noise that should be suppressed so that it is not heard by other users in the call. Based on determination of the existence of the background noise, an action to mitigate the background noise can be performed. For example, a notification can be automatically provided to the user. The notification can ask if the user would like to enable a mute option to suppress the background noise associated with the user from being heard by the other users in the call. More details relating to the present technology are provided herein.

FIG. 1 illustrates an example system 100 including a mute notification module 102, according to an embodiment of the present technology. The mute notification module 102 can provide a real time notification to a user participating in a call to select a mute option to suppress background noise associated with the user. Background noise associated with the user can include sounds created by the user or generated in the environment of the user. In some examples set forth herein, a video call is discussed for purposes of illustration. However, the present technology can apply to any type of call, such as an audio call, a video call (e.g., AR call, VR call, XR call), or any other type of communication between or among two or more users. The call can be conducted in real time or near real time.

In some embodiments, the system 100 can be implemented through a server system that is in communication over a communications network with client computing devices 112*a*, 112*b*, 112*c*, 112*d*, 112*e* of various users. In some embodiments, the client computing devices 112 can include or be implemented with a user device 610, as discussed in relation to FIG. 6. In some embodiments, some or all of the functionality of the mute notification module 102 can be performed by an application running on a client computing device 112. In some embodiments, some or all of the functionality of the mute notification module 102 can be performed by a server of the system 100. In some embodiments, the functionality of the mute notification module 102 can be distributed between an application running on a client computing device 112 and a server of the system 100. The system 100 can be associated with a suitable platform or system. For example, the system 100 can be implemented by a communication platform or system, such as a messaging system. Although a particular type of system may be referenced in various examples discussed herein, the present technology applies to any type of messaging platform or system, social networking platform or system, content sharing platform or system, or the like.

In some instances, the system 100 can include at least one data store (not shown) accessible to the mute notification module 102. The data store can maintain information required to support operation of the system 100 and the mute notification module 102. For example, the data store can maintain audio signals and video signals associated with a media stream that captures a user participating in a call. As another example, the data store can maintain machine learning models or algorithms to recognize human speech, to analyze audio data, to determine volume levels of sound reflected in the audio data, and to analyze video data. As yet another example, the data store can maintain threshold values to determine the existence of background noise that should be suppressed from a call, templates to generate notifications to indicate the existence of background noise, and other data utilized by the mute notification module 102.

The client computing devices 112*a*, 112*b*, 112*c*, 112*d*, 112*e* can be, for example, any combination of mobile devices and non-mobile devices, such as smart-phones, laptops, tablets, desktop computers, watches, etc. Each of the client computing devices 112*a*, 112*b*, 112*c*, 112*d*, 112*e* can include one or more applications running on the client computing device 112 and having functionality to support or perform the functionality of the present technology. An application on the client computing devices 112 can include an interface that is presented through a screen of the client computing device 112. A user of the client computing device 112 can interact with the application through appropriate inputs and commands (e.g., touch gestures) applied to the screen through which the interface of the application is presented. The application can allow a user to select various controls to optimize various aspects of a call in which the user is participating. When selected, the controls can, for example, increase volume, decrease volume, turn on camera, turn off camera, zoom in, zoom out, share screen, unshare screen, raise hand, unraise hand, add participant, remove participant, start recording, stop recording, mute, and unmute. Among other capabilities, the application can provide notifications to the user through the interface to convey information to the user about the call and to prompt the user to take action as appropriate. For example, upon a determination of the existence of background noise associated with a user, the application can provide a notification to the user about the existence of the background noise. The notification can request that the user select or enable a mute option to suppress the background noise so that the background noise is not heard (or no longer heard) by other users in the call.

The mute notification module 102 can include a signal analysis module 104, a background noise determination module 106, and a mitigation module 108. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the mute notification module 102 can be implemented in any suitable combinations.

The signal analysis module 104 can receive a signal (or media stream) including audio data and video data associated with a user participating in a call. The signal can be captured by components of a computing device controlled by the user to participate in the call. The signal analysis module 104 can extract from the signal an audio signal (or audio stream). The audio signal can contain audio data captured from a microphone of the computing device of the user during a call. For example, the audio data can represent sounds uttered by the user during the call, sounds generated through actions of the user during the call, or sounds generated in the environment of the user during the call. Sounds uttered by the user during the call can include, for example, speech, coughing, breathing, eating, and the like. Sounds generated through actions of the user during the call can include, for example, keyboard typing, finger tapping, clinking of utensils and dishes, and the like. Sounds generated in the environment of the user during the call can include, for example, a separate conversation not related to the call, a baby's crying, vacuum cleaner noise, a dog's barking, leaf blowing noise, and the like.

The signal analysis module 104 can utilize or implement a suitable voice activity detection (VAD) system or other type of speech recognition technique. Audio data can be provided to the voice activity detection system to determine whether the audio data, or a portion thereof, contains speech as opposed to other types of sounds. The voice activity detection system can generate an output indicating whether or not the audio data contains speech. In some instances, the voice activity detection system also can generate a confidence level describing the amount of certainty with which the voice activity detection system has determined the presence of speech in the audio data. For example, the voice activity detection system can generate a determination indicating that audio data does not contain speech along with an associated confidence level (e.g., 85%) for the determination.

The signal analysis module 104 can determine a volume level of the audio data. The signal analysis module 104 can determine a volume level of the audio data through a variety of techniques. In some embodiments, frequency components of the associated audio signal can be split up into a selected number of frequency bins. Each frequency bin can be associated with a unique range of frequency values. For example, a first set of frequency components of the audio signal having frequencies that fall within a first frequency range can be assigned to the first frequency bin; a second set of frequency components of the audio signal having frequencies that fall within a second frequency range can be assigned to the second frequency bin; a third set of frequency components of the audio signal having frequencies that fall within a third frequency range can be assigned to the third frequency bin; and so on. The selected number of frequency bins can be configurable based on preferences or constraints relating to a particular implementation.

The signal analysis module 104 can determine a volume level for each frequency bin based on the amplitude of the frequency components assigned to the frequency bin. For example, a volume level for each frequency bin can be determined by averaging the volume levels of the frequency components assigned to the frequency bin. The volume levels of the selected number of frequency bins can be averaged to determine a volume level of the audio data associated with the audio signal. In some embodiments, the volume level of the audio data can be normalized. For example, the volume level of the audio data can be converted to value falling within a predetermined range of values. In one implementation, the volume level of the audio data can be converted to a value between the values of 0 and 10, with the value of 0 representing the lowest volume level and the value of 10 representing the highest volume level. The foregoing are merely examples, and many variations are possible.

The background noise determination module 106 can determine the existence of background noise in the audio data that should be suppressed from a call. The determination of the existence of background noise that should be suppressed from the call can be based on a variety of considerations. In some embodiments, the considerations can include a first consideration regarding whether the audio data does not contain speech and a second consideration regarding the volume level of the audio data, as determined by the signal analysis module 104. The background noise determination module 106 can obtain a first sample of the audio data corresponding to a selected first time interval (e.g., last five seconds). The background noise determination module 106 also can obtain a second sample of the audio data corresponding to a selected second time interval (e.g., last three seconds). The selected first time interval and the selected second time interval can be measured from the point in time of the audio data corresponding to the last (most current) sounds received by signal analysis module 104. The selected first time interval and the selected second time interval are configurable and can vary based on experimentation or a particular implementation. In some instances, the selected first time interval and the selected second time interval can be different durations of time. In some instances, the selected first time interval and the selected second time interval can be the same duration of time.

Based on the signal analysis module 104, the background noise determination module 106 can evaluate the first consideration and the second consideration. The first consideration relating to the absence of speech ensures that speech of a user that is intended to be heard by other users in a call will not be suppressed. The second consideration relating to the satisfaction of a predetermined volume level threshold ensures that only background noise that rises to a certain level of disruption will warrant potential selection of the mute control. The predetermined volume level threshold is configurable and can be selected to target background noise having a certain volume level for suppression from a call. For example, if only relatively louder sounds are to be targeted for suppression, the predetermined volume level threshold can be set to a relatively higher value. Or, if both relatively less loud sounds and relatively louder sounds are to be targeted, the predetermined volume level threshold can be set to a relatively lower value. As just one example, where the volume level of the audio data is normalized to fall within a predetermined range of values (e.g., between 0 and 10), the predetermined volume level threshold can be expressed as a value within the predetermined range of values (e.g., 7). In some embodiments, a volume level threshold is not predetermined. Rather, the volume level threshold can be based on volume levels associated with a particular call, user in the call, or surroundings of the user in the call. For example, the volume levels of a particular user in a particular call or environment can be monitored and determined for a rolling or selected period of time. From the volume levels, a maximum volume and a minimum volume can be determined. The volume level threshold to target background noise for suppression can be expressed as, for example, a selected percentage (e.g., 70%, 130%, etc.) of the maximum volume or minimum value rather than a particular absolute loudness value measured in, for example, decibels. Many variations are possible.

If the first sample of the audio data corresponding to the first time interval is determined to not contain speech in relation to the first consideration and if the volume level of the second sample of the audio data corresponding to the second time interval satisfies the predetermined volume level threshold in relation to the second consideration, the background noise determination module 106 can determine the existence of background noise associated with the user that should be suppressed from the call. In response to determination of the existence of such background noise, certain responsive action can be taken. Responsive action can include a variety of actions, such as provision of a notification to prompt selection of a mute control, as discussed in more detail herein. If the first sample of the audio data corresponding to the first time interval does contain speech or if the volume level of the second sample of the audio data corresponding to the second time interval does not satisfy the predetermined volume level threshold, the background noise determination module 106 can determine the absence of background noise that should be suppressed from the call. Upon a determination of the absence of such background noise, responsive action is not taken. The background noise determination module 106 can continuously or periodically check whether the first sample of the audio data corresponding to the first time interval does not contain speech and whether the volume level of the second sample of the audio data corresponding to the second time interval satisfies a predetermined volume level threshold. The background noise determination module 106 can perform such checks at a selected frequency during the time that the user participates in the call.

Many variations are possible. For example, in some embodiments, the background noise determination module 106 can determine the existence of background noise that should be suppressed based only on a determination that the first sample of audio data corresponding to the first time interval does not contain speech. In these embodiments, the volume level of the audio data can be irrelevant to make such a determination. Upon making such a determination, responsive action can be taken. For example, a notification can be provided to prompt muting of the background noise.

As another example, in some embodiments, the background noise determination module 106 can determine the existence of background noise that should be suppressed based on a confidence level associated with the detection of the absence of speech as yet another consideration. For example, the signal analysis module 104 can generate a determination regarding whether audio data does not contain speech along with a confidence level associated with the determination. The confidence level can be compared with a confidence level threshold so that a desired amount of certainty that sound reflected in the audio signal is not speech can be achieved before suppressing the sound from a call. If the confidence level of a determination of the absence of speech in sounds satisfies the confidence level threshold, action can be taken to suppress the sounds. The confidence level threshold is configurable. Based on the requirements of a particular implementation, the confidence level threshold can be appropriately selected to ensure a desired level of certainty regarding the absence of speech before an attempt to mitigate background noise is performed. For example, where it is desirable to be more cautious (or certain) regarding the existence of background noise and the absence of speech before mitigation is performed, the confidence level threshold can be set to a relatively higher value. On the other hand, where there is less need to be cautious (or certain) regarding the existence of background noise and the absence of speech, the confidence level threshold can be set to a relatively lower value.

In some embodiments, an initial determination by the signal analysis module 104 regarding the absence of speech and an associated confidence level can be verified or complemented based on other considerations. For example, a server system that enables the connection of all users in a call can determine that a particular call participant is speaking during the call. To make this determination, a computing system of the particular call participant can utilize a voice activity detection (VAD) system to determine that the particular call participant is speaking and can send an indication to the server system that the particular call participant is speaking. Additionally or alternatively, the server system can receive media streams of all users participating in the call. The server system can apply a voice activity detection system to the audio data of each media stream. Based on the voice activity detection system, the server system can independently determine which particular call participant is currently speaking. The determination of the particular call participant who is currently speaking can be provided to the computing device of a user associated with the initial determination of background noise (or the computing devices of all users in the call). If the particular call participant who is currently speaking is different from the user associated with the initial determination of background noise, the background noise determination module 106 can have a selected level of additional confidence about the existence of background noise in relation to the user. The selected level of additional confidence can be based on the observation that two users will tend to avoid speaking at the same time during a call. In some instances, the selected level of additional confidence can be aggregated (e.g., added) with the confidence level associated with the initial determination regarding the absence of speech to generate a total level of confidence. The total level of confidence can be compared with a confidence level threshold to determine the potential presence of background noise that should be suppressed from a call.

The mitigation module 108 can take responsive action to mitigate background noise that should be suppressed from a call. In some embodiments, the mitigation module 108 can generate a notification about background noise emanating from a user or the environment of the user during a call. For example, the notification can be provided to the user during the call. In some embodiments, the notification can include a message that makes the user aware of the background noise. In some embodiments, the notification can include a message that suggests that the user select a mute option of the application on the computing device enabling the call to suppress the background noise. In some embodiments, the notification can include a message that asks the user to consider potentially selecting the mute option. In some embodiments, the notification can include any combination of the foregoing messages or other types of messages. In response to the notification, the user can select a mute control to suppress the background noise.

In some embodiments, for as long as background noise that should be suppressed is detected, the mitigation module 108 can cause provision of a notification. In this regard, the notification can be continuously displayed during the time such background noise is detected. In some embodiments, once a check determines such background noise is no longer present, the mitigation module 108 can cease causing provision of the notification.

The mitigation module 108 can provide different notifications in various implementations in response to a determination that the user is associated with background noise that should be suppressed. In some embodiments, the mitigation module 108 can provide a notification to the user that informs the user that the user will be muted because of background noise. In this regard, the mitigation module 108 can proceed to mute the user without action taken by the user. In some embodiments, the mitigation module 108 can mute the user without action taken by the user, and then provide a notification to the user that informs the user that the user has been muted because of background noise. In some embodiments, the muting of a user without action taken by the user can be performed automatically or in response to a command by a moderator of the call to mute the user. For example, a notification can be provided for a moderator or other participant in the call apart from the user. The notification can ask if the moderator or the other participant would like to mute the user associated with background noise. If the moderator or the other participant would like to mute the user, the moderator or the other participant can select an option to mute the user. In some embodiments, the muting of a user without action taken by the user can be performed if a configurable setting to allow such automatic muting has been selected by a moderator or the user.

A notification generated by the mitigation module 108 can be displayed through an interface of the application utilized by a computing device of the user to conduct a call. The notification can take any suitable form. For example, the notification can appear as a message in a pop up box. In some embodiments, the notification can be an audible message directed to the user. Some examples of notifications that can be provided by the mitigation module 108 are further discussed below.

Figure 2A:
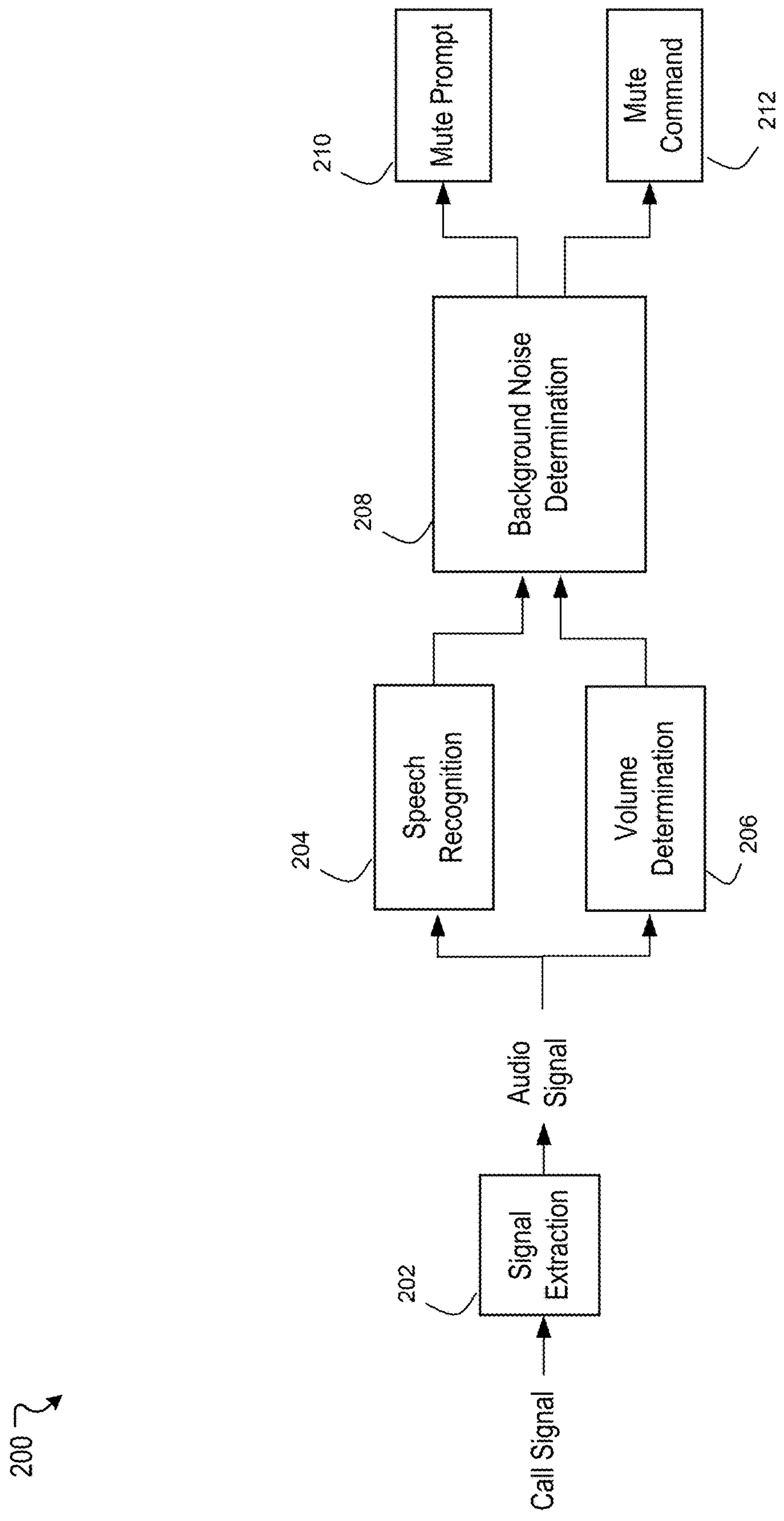
FIG. 2A illustrates an example functional block diagram, according to an embodiment of the present technology.

FIG. 2A illustrates an example functional block diagram 200, according to an embodiment of the present technology. In some embodiments, the functionality of the block diagram 200 can be implemented or performed by the mute notification module 102. The functional block diagram 200 illustrates the generation of a notification regarding the background noise associated with a user in a call that should be suppressed from the call. In some embodiments, the functionality of the block diagram 200 can be performed by a computing device (e.g., client computing device) of the user. As shown, a call signal is received. The call signal can be a media stream of audio data and video data captured by, respectively, a microphone and a camera of the computing device of the user during the call. At 202, an extraction can be performed on the call signal to separate an audio signal from a video signal. At 204, speech recognition can be performed on the audio signal to detect whether speech is present or absent in the audio signal. At 206, the volume level of the audio signal can be determined. The determination of the absence of speech and the determination of the volume level with respect to the audio signal can be performed as described herein. At 208, the existence of background noise that should be suppressed from the call can be determined when the absence of speech has been detected and when the volume level of the audio signal satisfies a volume level threshold. In response to determination of background noise to be suppressed, a responsive action can be taken to redress or mitigate the background noise. In some cases, the responsive action can be a mute prompt 210 in the form of a notification to the user suggesting or requesting that the user enable a mute option. In some cases, the responsive action can be a mute command 212 that causes automatic muting of the user without action taken by the user. The mute command 212 can be accompanied by provision of a notification to the user that the user has been or will be muted because of background noise.

Figure 2B:
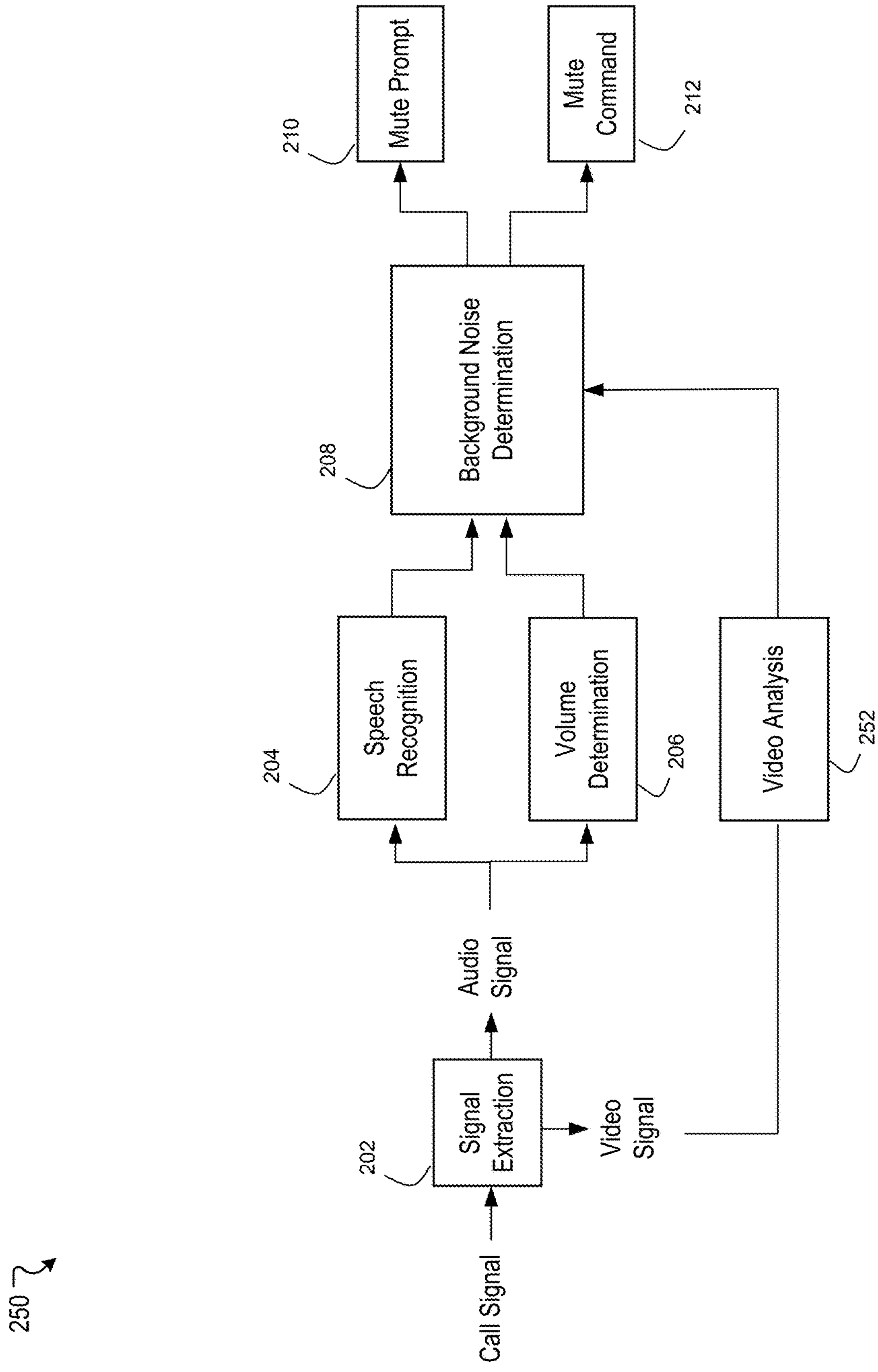
FIG. 2B illustrates an example functional block diagram, according to an embodiment of the present technology.

FIG. 2B illustrates an example functional block diagram 250, according to an embodiment of the present technology. The functionality and operation of the components and elements in the block diagram 250 that also appear in the block diagram 200 have been described in relation to FIG. 2A and need not be repeated here. Additionally, in the block diagram 250, video analysis can be performed on the video signal at block 252 as a further consideration in the determination of the existence of background noise that should be suppressed. The video analysis can provide an independent or complementary determination regarding whether the user is speaking. For example, a machine learning model can be trained to determine whether a person depicted in an image or video is speaking. As another example, the machine learning model can be trained to determine whether a person depicted in an image or video is not speaking. When video of the user captured during a call is provided to the machine learning model, it can be determined if the user is speaking or not. A determination that the user is not speaking based on video data can support, bolster, or otherwise verify a determination that the user is not speaking based on a speech recognition technique applied to the audio data at block 204. As a result, a determination of the existence of background noise and the absence of speech by the user can be made with more confidence by utilizing the video signal.

Figure 3A:
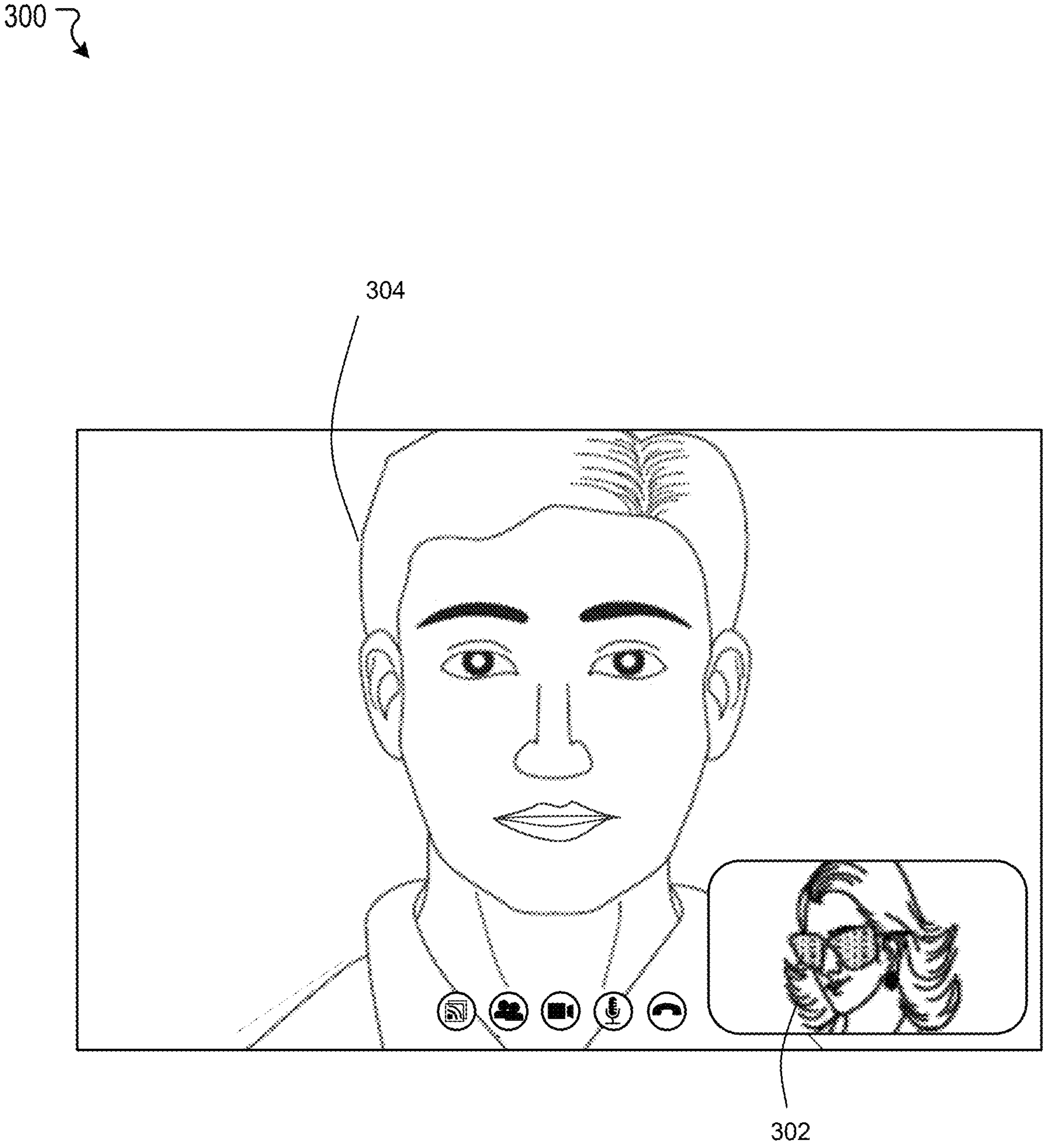
FIG. 3A illustrates an example view of an interface for calling, according to an embodiment of the present technology.
Figure 3B:
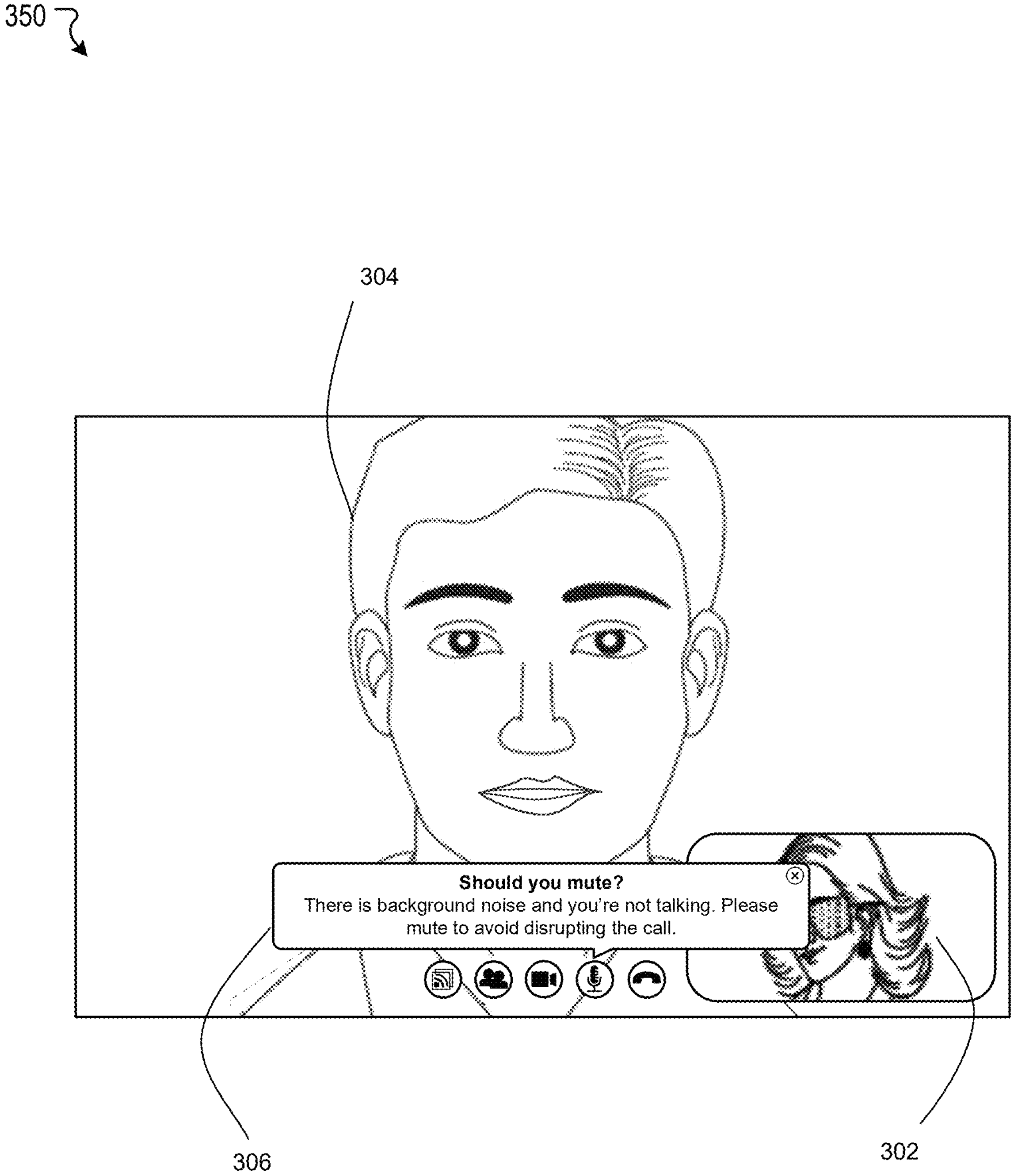
FIG. 3B illustrates an example view of an interface including a first type of notification, according to an embodiment of the present technology.
Figure 4:
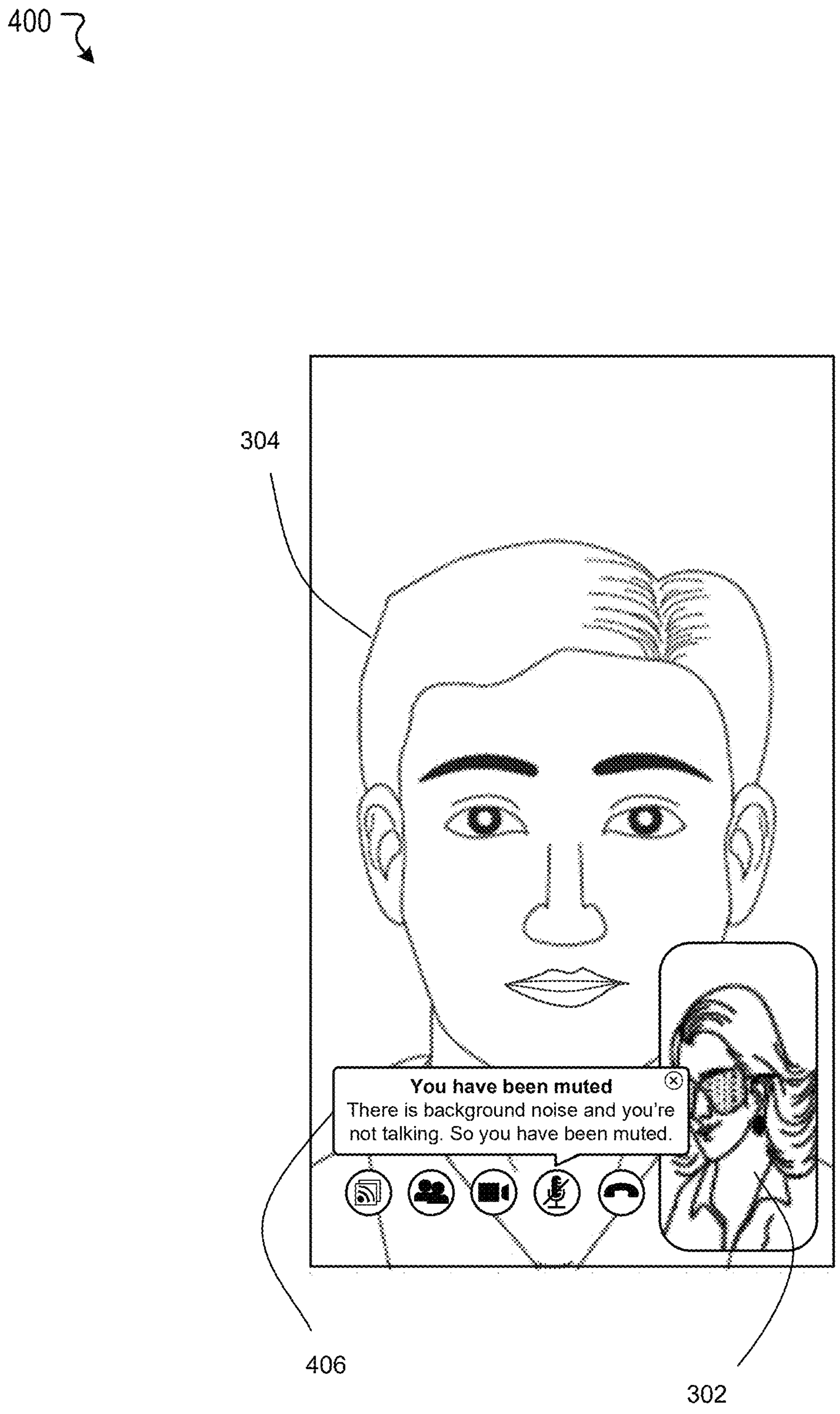
FIG. 4 illustrates an example view of an interface including a second type of notification, according to an embodiment of the present technology.

FIGS. 3A-4 illustrate example views relating to provision of notifications displayable in an interface of an application that can be presented through a screen of a computing device of a user in a call, according to an embodiment of the present technology. As discussed, any type of computing device and associated screen can be utilized. In some embodiments, the notifications can be generated by the mute notification module 102 or, in particular, the mitigation module 108.

In FIG. 3A, a view 300 of an interface of the application is presented to a user 302 in a call. In the example shown, the call includes the user 302 and another participant 304 who is currently speaking. In other examples, any number of users can participate in a call. No background noise emanating from the user 302 or the environment of the user 302 has been detected yet.

In FIG. 3B, a view 350 of an interface of the application is presented to a user 302. The existence of background noise that should be suppressed from the call has been determined with respect to the user 302. Such background noise can be any type of sound that is not intended or otherwise appropriate for hearing by other participants in the call, such as a user 304. Such types of sounds can include, for example, tapping on a keyboard, extended coughing, a crying baby, construction work, a barking dog, a running vacuum cleaner, traffic noise, landscape work, emergency vehicle sirens, and the like. The determination of the existence of background noise that should be suppressed causes display of a notification 306. In this example, the notification 306 informs the user 302 that background noise has been detected and that no speech of the user has been detected. The notification 306 also asks the user 302 to consider muting so that the background noise is not heard by others (i.e., the user 304) in the call. In some instances, the notification 306 can be continuously displayed to the user 302 as long as the background noise is present and until the user 302 enables muting. If the user 302 desires to mute, the user 302 can enable muting by selection of an appropriate mute control of the application.

In FIG. 4, a view 400 of an interface of the application is presented to a user 302 in a call in which a user 304 is also participating. The existence of background noise that should be suppressed has been determined with respect to the user 302. For example, the determination of the existence of such background noise may be provided to a moderator of the call. In response to the determination, the moderator can take action to mute the user 302. After the user 302 has been muted, a notification 406 can be provided for the user 302. In this example, the notification 406 informs the user 302 that background noise has been detected and that no speech of the user has been detected. The notification 406 also indicates that the user 302 has been automatically muted without action taken by the user 302. In some instances, the muting of the user 302 and presentation of the notification 406 can automatically cease after a determination that the background noise has ceased. The foregoing are merely illustrations and many variations are possible.

Figure 5:
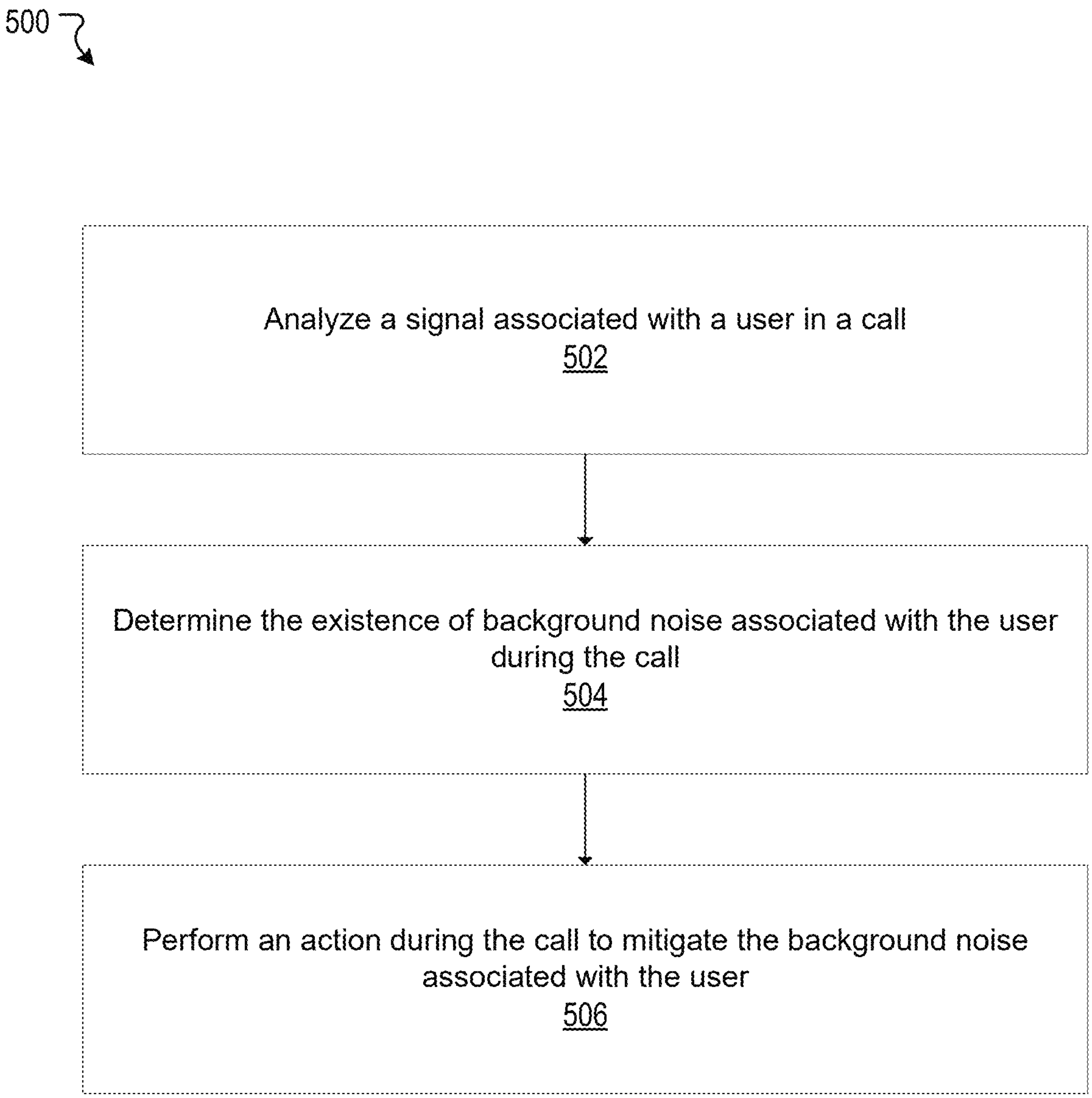
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the method 500 can analyze a signal associated with a user in a call. At block 504, the method 500 can determine the existence of background noise associated with the user during the call. At block 506, the method 500 can perform an action during the call to mitigate the background noise associated with the user.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
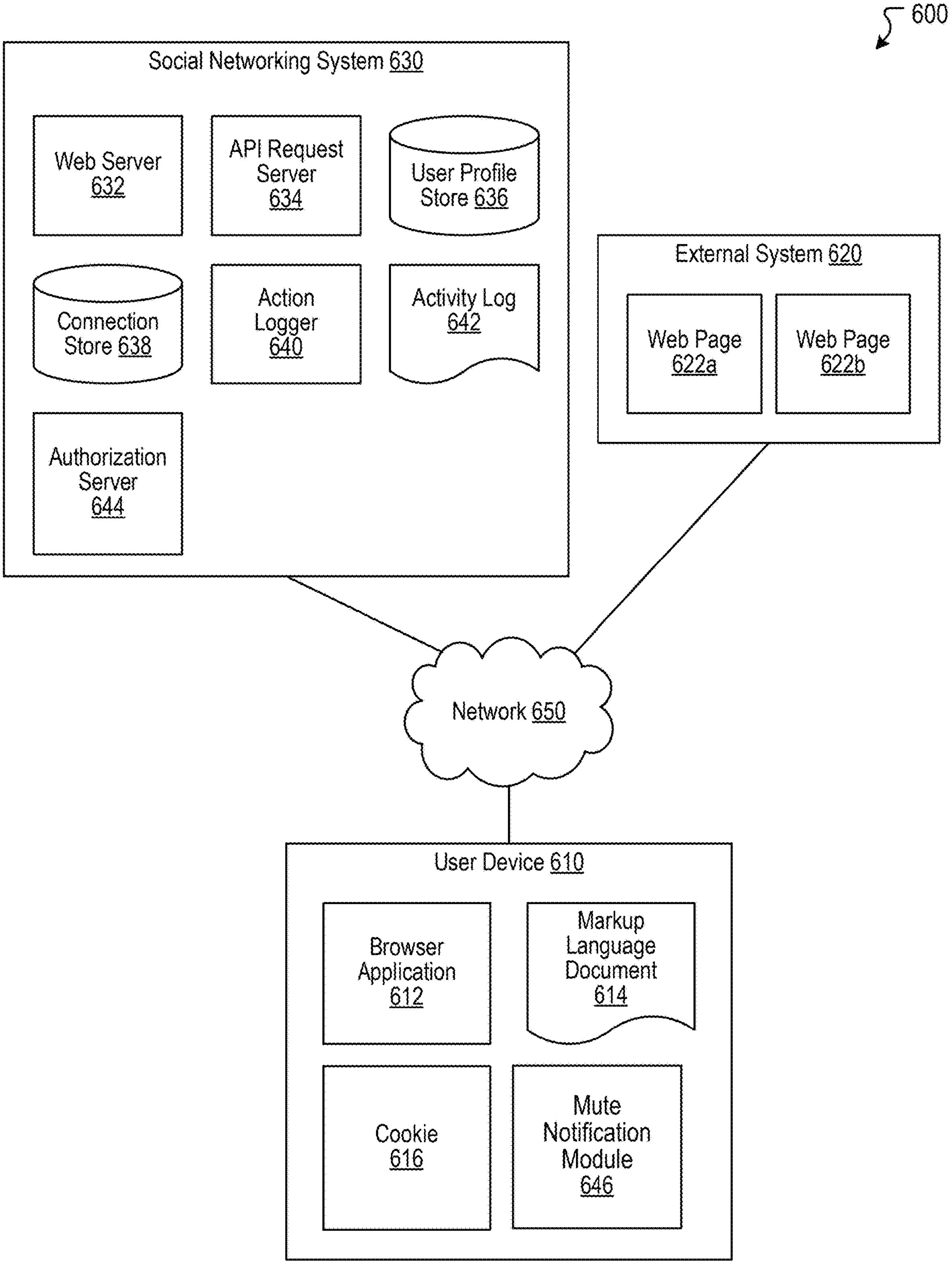
FIG. 6 illustrates a network diagram of an example system including an example social networking system, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term “friend” refers to any other user of the social networking system 630 to whom a user has formed a connection, association, or relationship via the social networking system 630. For example, in an embodiment, if users in the social networking system 630 are represented as nodes in the social graph, the term “friend” can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms “user” and “friend” depend on the frame of reference. Connections between users of the social networking system 630 are usually bilateral (“two-way”), or “mutual”, but connections may also be unilateral, or “one-way”. For example, if Bob and Joe are both users of the social networking system 630 and connected to each other, Bob and Joe are each other’s connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a mute notification module 646. The mute notification module 646 can be implemented with the mute notification module 102, as discussed in more detail herein. In various embodiments, some or all functionality of the mute notification module 646 can be additionally or alternatively implemented by the social networking system 630. It should be appreciated that there can be many variations or other possibilities.

Hardware Implementation

Figure 7:
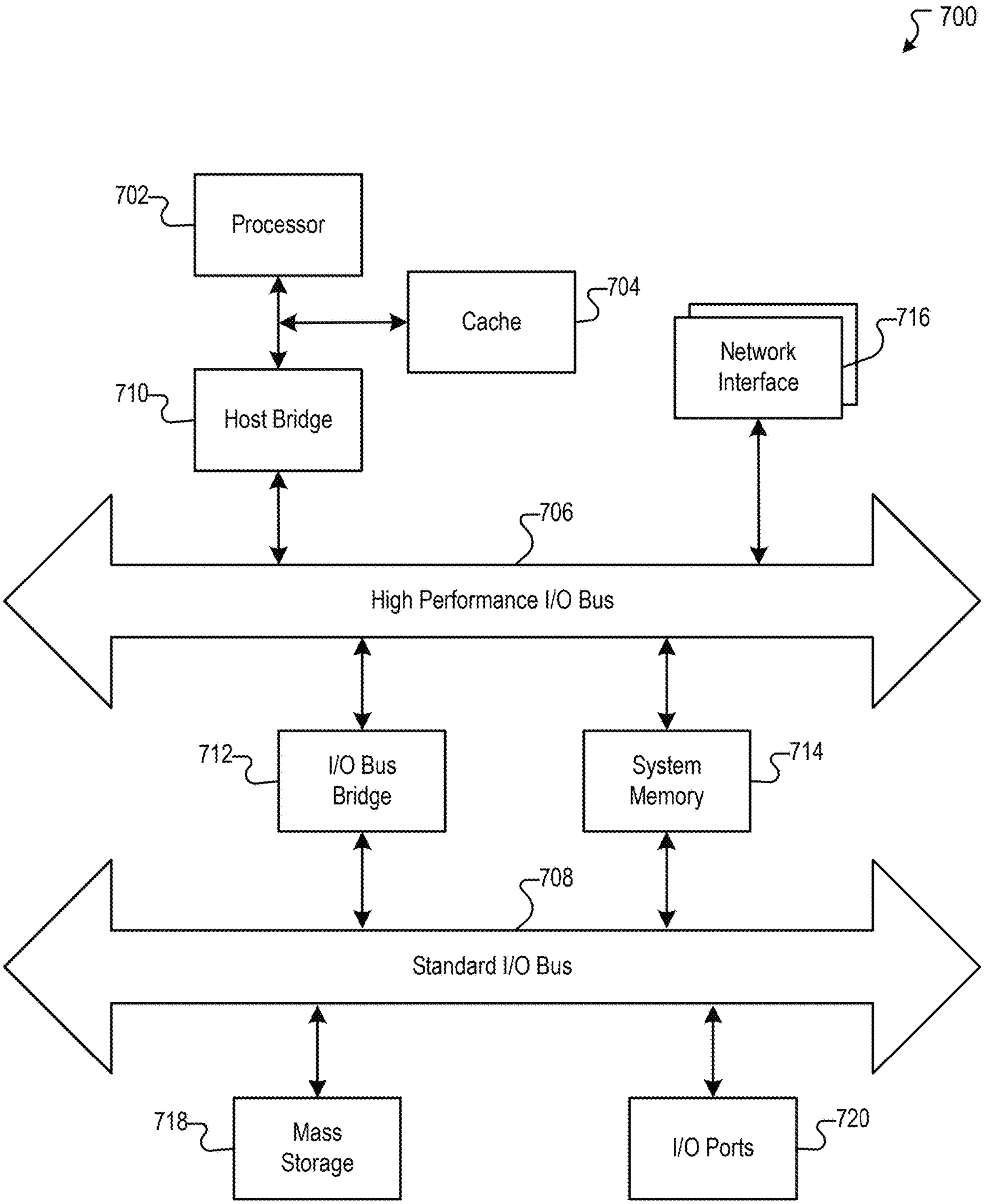
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

analyzing, by a computing system, a signal associated with a user in a call;

determining, by the computing system, an existence of background noise associated with the user during the call;

determining, by the computing system, that the background noise associated with the user is above a threshold value, wherein the threshold value is based on a percentage of a current maximum volume detected in the call;

presenting, by the computing system, a notification indicating the existence of the background noise for as long as the background noise is detected above the threshold value, wherein the notification prompts selection of a mute control;

determining, by the computing system, at least one of: that the user is speaking or a volume of the background noise is below the threshold value; and ceasing, by the computing system and based on determining at least one of: that the user is speaking or a volume of the background noise is below the threshold value, presentation of the notification while the call is still ongoing.

2. The computer-implemented method of claim 1, wherein the notification is presented to a participant in the call other than the user to prompt selection of a mute control.

3. The computer-implemented method of claim 1, further comprising muting the user without action taken by the user.

4. The computer-implemented method of claim 1, wherein the determining the existence of background noise is based on a determination of an absence of speech in audio data of the signal.

5. The computer-implemented method of claim 4, wherein the determining the existence of background noise is further based on a determination of a volume level of the audio data.

6. The computer-implemented method of claim 5, wherein the determining the existence of background noise is further based on satisfaction of a threshold confidence level by a confidence level associated with the determination of the absence of speech in the audio data and satisfaction of a threshold volume level by the volume level of the audio data.

7. The computer-implemented method of claim 6, wherein the confidence level associated with the determination of the absence of speech in the audio data is based at least in part on a determination that a participant in the call who is talking is not the user.

8. The computer-implemented method of claim 1, wherein the determining the existence of background noise is based at least in part on a determination that video data of the signal does not reflect speaking by the user.

9. A system comprising:

at least one processor; and a memory storing instructions that, when executed by the at least one processor, cause the system to perform operations comprising:

analyzing a signal associated with a user in a call;

determining an existence of background noise associated with the user during the call;

determining that the background noise associated with the user is above a threshold value, wherein the threshold value is based on a percentage of a current maximum volume detected in the call;

presenting a notification indicating the existence of the background noise for as long as the background noise is detected above the threshold value, wherein the notification prompts selection of a mute control;

determining at least one of: that the user is speaking or a volume of the background noise is below the threshold value; and ceasing, based on determining at least one of: that the user is speaking or a volume of the background noise is below the threshold value, presentation of the notification while the call is still ongoing.

10. The system of claim 9, wherein the notification prompts selection of a mute control.

11. The system of claim 9, wherein the instructions further cause the system to perform operations comprising muting the user without action taken by the user.

12. The system of claim 9, wherein the determining the existence of background noise is based on a determination of an absence of speech in audio data of the signal.

13. A non-transitory computer-readable storage medium including instructions that, when executed by at least one processor of a computing system, cause the computing system to perform operations comprising:

analyzing a signal associated with a user in a call;

determining an existence of background noise associated with the user during the call;

determining that the background noise associated with the user is above a threshold value, wherein the threshold value is based on a percentage of a current maximum volume detected in the call;

presenting a notification indicating the existence of the background noise for as long as the background noise is detected above the threshold value, wherein the notification prompts selection of a mute control;

determining at least one of: that the user is speaking or a volume of the background noise is below the threshold value; and ceasing, based on determining at least one of: that the user is speaking or a volume of the background noise is below the threshold value, presentation of the notification while the call is still ongoing.

14. The non-transitory computer-readable storage medium of claim 13, wherein the notification is presented to a participant in the call other than the user to prompt selection of a mute control.

15. The non-transitory computer-readable storage medium of claim 13, wherein the instructions further cause the computing system to perform operations comprising muting the user without action taken by the user.

16. The non-transitory computer-readable storage medium of claim 13, wherein the determining the existence of background noise is based on a determination of an absence of speech in audio data of the signal.

* * * * *